United States Patent
Tachibana et al.

(10) Patent No.: US 11,480,237 B2
(45) Date of Patent: Oct. 25, 2022

(54) INTERMITTENT DRIVE DEVICE

(71) Applicant: FUJIFILM Business Innovation Corp., Tokyo (JP)

(72) Inventors: Kohei Tachibana, Kanagawa (JP); Yuya Shiokawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/408,472

(22) Filed: Aug. 22, 2021

(65) Prior Publication Data
US 2022/0307577 A1     Sep. 29, 2022

(30) Foreign Application Priority Data

Mar. 24, 2021  (JP) .............................. JP2021-049361

(51) Int. Cl.
*F16H 29/12*     (2006.01)
*B41J 11/14*     (2006.01)
*F16H 27/08*     (2006.01)

(52) U.S. Cl.
CPC .............. *F16H 29/12* (2013.01); *B41J 11/14* (2013.01); *F16H 27/08* (2013.01)

(58) Field of Classification Search
CPC .......... F16H 27/08; F16H 27/10; F16H 29/12; F16H 31/003; B41J 11/14; B41J 23/04; B65H 3/0669
USPC ................................ 74/24, 84 R, 125.5, 435
See application file for complete search history.

(56) References Cited

U.S. PATENT DOCUMENTS

| | | | | |
|---|---|---|---|---|
| 4,319,495 A | * | 3/1982 | Salicini ................... | B65B 65/02 74/813 L |
| 6,779,640 B2 | * | 8/2004 | Tomita .................... | F16D 7/021 192/24 |
| 7,188,718 B2 | * | 3/2007 | Tomita ................. | B65H 3/0669 192/24 |
| 7,931,265 B2 | * | 4/2011 | Okamoto ............. | B65H 3/0623 74/435 |
| 9,541,884 B1 | * | 1/2017 | Kawai ................ | G03G 21/1647 |
| 9,828,197 B2 | * | 11/2017 | Hashimoto .......... | B65H 3/0669 |
| 10,118,778 B2 | * | 11/2018 | Kawashima ............. | B65H 1/08 |

(Continued)

FOREIGN PATENT DOCUMENTS

| | | |
|---|---|---|
| JP | 2005227315 | 8/2005 |
| JP | 2008164151 | 7/2008 |
| JP | 2011185293 | 9/2011 |

*Primary Examiner* — Joseph Brown
(74) *Attorney, Agent, or Firm* — JCIPRNET (57) ABSTRACT

An intermittent drive device includes a tooth-missing gear having a tooth row partially missing, an output gear, an input gear provided with a first tooth row receiving a driving force and a second tooth row transmitting the driving force to the tooth-missing gear and arranged at a position apart from the output gear in a rotation axis direction. A shaft joint member moves in the rotation axis direction to a first position where the driving force is transmitted to the output gear and a second position where the transmission is released. A tooth-missing gear control mechanism starts rotation of the tooth-missing gear from a state where the driving force from the input gear is released and meshes with the input gear. A switching mechanism switches a position of the shaft joint member in the rotation axis direction between the first position and the second position.

9 Claims, 9 Drawing Sheets

(56) References Cited

U.S. PATENT DOCUMENTS

| | | | | |
|---|---|---|---|---|
| 2013/0134656 A1* | 5/2013 | Akatsuka | ................ | B65H 1/14 |
| | | | | 271/147 |
| 2015/0042033 A1* | 2/2015 | Fukita | ..................... | B65H 1/12 |
| | | | | 271/160 |
| 2018/0080505 A1* | 3/2018 | Hashimoto | .............. | B65H 7/00 |
| 2019/0031456 A1* | 1/2019 | Sawashima | .......... | B65H 3/0669 |

* cited by examiner

INTERMITTENT DRIVE DEVICE

CROSS-REFERENCE TO RELATED APPLICATIONS

This application is based on and claims priority under 35 USC 119 from Japanese Patent Application No. 2021-049361 filed Mar. 24, 2021.

BACKGROUND

(i) Technical Field

The present invention relates to an intermittent drive device.

(ii) Related Art

Intermittent drive devices that repeat driving and stop of the driving are used in various fields. For example, in printers that transport paper to perform printing on the paper, the transport and printing of the paper are synchronized by temporarily stopping the transported paper and then restarting the transport. In a case where a motor that switches between rotation and rotation stop at high speed is provided in realizing this intermittent drive, the cost tends to become high, and the size tends to become large. A configuration is adopted in which, while an input gear that receives drive from a motor side is continuously rotated by using a solenoid and a tooth-missing gear, a driving force is transmitted to an output gear that transmits the driving force to other members, or the transmission is cut off.

JP2011-185293A and JP2008-164151A disclose an intermittent drive device that adopts a solenoid and a tooth-missing gear and requires a tooth-missing drive gear that drives the tooth-missing gear separately from an input gear.

Additionally, JP2005-227315A discloses an intermittent drive device in which a solenoid and a tooth-missing gear are adopted and an input gear is also used to drive the tooth-missing gear.

SUMMARY

In the case of a configuration in which the tooth-missing gear is driven by the tooth-missing drive gear separate from the input gear, the tooth-missing gear can be driven at an appropriate speed separately from the rotational speed of the input gear. However, since dual-system driving is required, an increase in size is easily caused. Additionally, even in the intermittent drive device in which the input gear is also used to drive the tooth-missing gear, in the case of a configuration in which a tooth row in which the input gear receives the driving from a drive source and a tooth row that drives the tooth-missing gear are the same tooth rows, the tooth-missing gear cannot be driven at an appropriate speed and the stability lacks.

Aspects of non-limiting embodiments of the present disclosure relate to an intermittent drive device that can save space and that also serves to drive a tooth-missing gear with an input gear, as compared to the case of a configuration in which a tooth-missing gear is driven by a tooth-missing drive gear separate from an input gear, and that enables stable operation switching as compared to the case of a configuration in which a tooth row in which the input gear receives the driving from a drive source and a tooth row that drives the tooth-missing gear is driven are the same tooth rows.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an intermittent drive device including: a tooth-missing gear in which a tooth row is partially missing; an output gear; an input gear that is provided with a first tooth row that receives a driving force and does not come into contact with the tooth-missing gear and a second tooth row that transmits the driving force to the tooth-missing gear and that is arranged at a position apart from the output gear in a rotation axis direction; a shaft joint member that moves in the rotation axis direction to a first position where the driving force of the input gear is transmitted to the output gear and a second position where the transmission is released; a tooth-missing gear control mechanism that starts rotation of the tooth-missing gear from a state in which the driving force from the input gear is released and meshes with the input gear; and a switching mechanism that switches a position of the shaft joint member in the rotation axis direction between the first position and the second position.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described.

Figure 1:
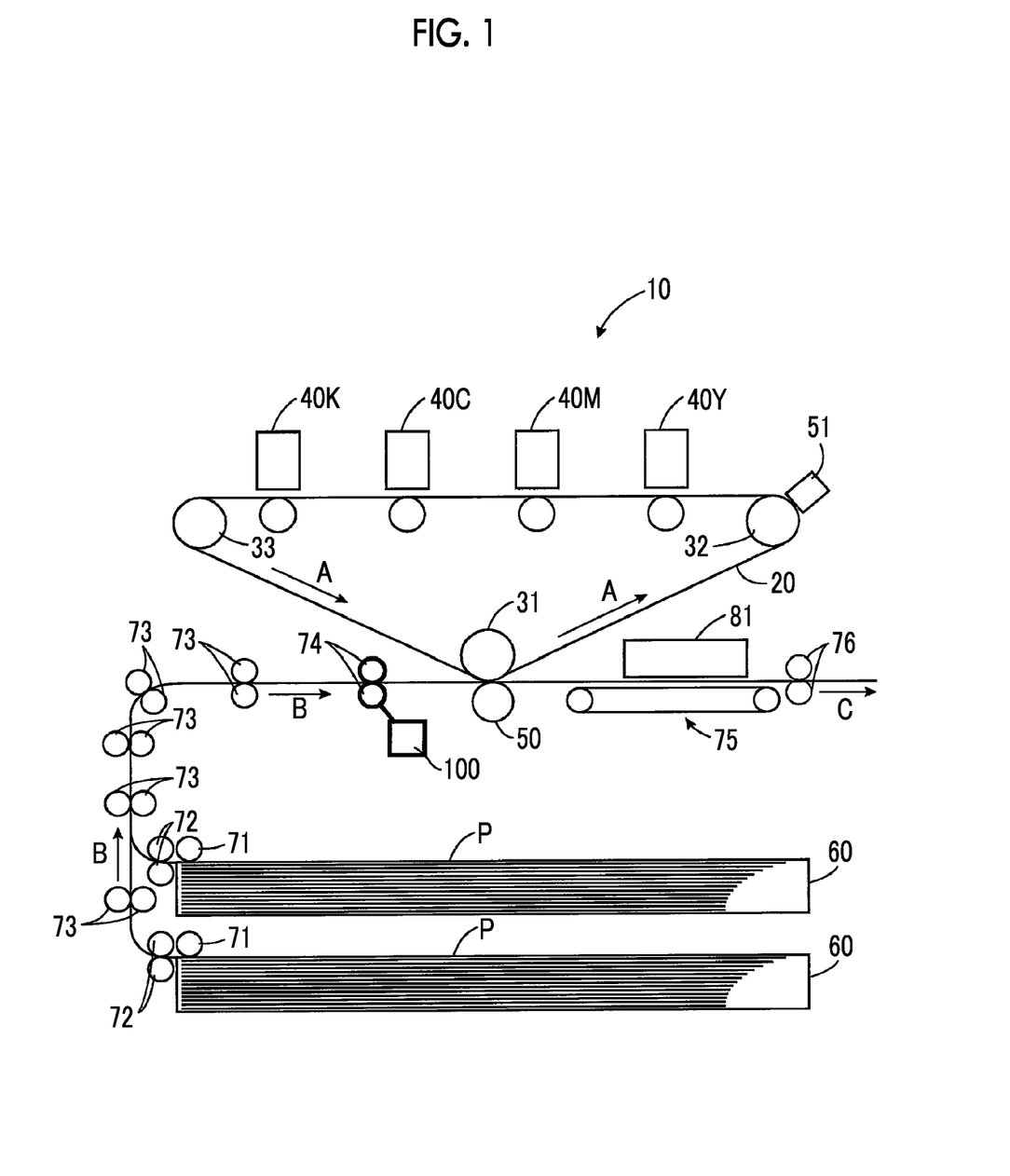
FIG. 1 is a schematic view of an ink jet printer.

FIG. 1 is a schematic view of an ink jet printer. In the ink jet printer, an intermittent drive device serving as an exemplary embodiment of the present invention is adopted.

The ink jet printer 10 is provided with an endless transfer belt 20. The transfer belt 20 is wound around a plurality of rolls 31, 32, 33 and calculatingly moves in the direction of an arrow A.

Additionally, in the ink jet printer 10, four print heads 40Y, 40M, 40C, and 40K are provided at an upper portion of the transfer belt 20. The print heads 40Y, 40M, 40C, and 40K are ink jet type print heads, and sequentially jet yellow, magenta, cyan, and black inks onto the transfer belt 20 to form ink images in respective colors on the transfer belt 20. In a case where the ink images in the respective colors are formed on the transfer belt 20, printing is performed in synchronization with the movement of the transfer belt 20 in the direction of the arrow A such that a color ink image is formed on the transfer belt 20 as a whole.

The ink images formed on the transfer belt 20 reach a transfer position sandwiched between a transfer roll 31, which is one of a plurality of rolls 31, 32, and 33 around which the transfer belt 20 is wound, and a backup roll 50, with the movement of the transfer belt 20. Then, at the transfer position, the ink images formed on the transfer belt 20 are transferred onto a paper transported to the transfer position. The transport of the paper will be described below. The transfer belt 20 after the transfer of the ink images is further moved, the surface thereof is cleaned by a cleaner 51, and ink images are formed again by the print heads 40Y, 40M, 40C, and 40K.

The ink jet printer 10 is provided with two paper trays 60. Paper P is accommodated in a stacked state in each paper tray 60. In printing, the paper P is taken out from any of the two paper trays 60 by a pickup roll 71, and only one sheet of paper is surely delivered by a handling roll 72. The delivered paper P is transported in the direction of an arrow B by a transport roll 73 until a leading end of the paper reaches a timing adjustment roll 74. Then, the paper P transported to the timing adjustment roll 74 is delivered so as to reach the transfer position at the timing where the ink images formed on the transfer belt 20 reach the transfer position sandwiched between the transfer roll 31 and the backup roll 50 by the timing adjustment roll 74.

The paper P to which the ink images have been transferred at the transfer position is further transported riding on a transport belt 75. Then, while the paper P is transported by the transport belt 75, the ink images on the paper P are dried by the heat from a dryer 81, and an image fixed on the paper P is formed. The paper P is delivered to the outside of the ink jet printer 10 by a delivery roll 76 in the direction of an arrow C.

Here, the paper P is transported so as to reach the timing adjustment roll 74 at a slightly earlier timing and is delivered toward the transfer position at a timing synchronized with the ink images on the transfer roll 31 by the timing adjustment roll 74. For this reason, the timing adjustment roll 74 repeats rotation and stop. Thus, an intermittent drive device 100 is provided here. Although the details will be described below, the intermittent drive device 100 includes an input gear that receives an input of a driving force and an output gear that transmits the driving force to the timing adjustment roll 74. The driving force from a motor (not shown) is continuously input to the input gear. Then, the intermittent drive device 100 transmits the driving force continuously input to the input gear to the output gear or cuts off the transmission to the output gear depending on control. The timing adjustment roll 74 stops or rotates in response to the intermittence of the driving force from the output gear.

Hereinafter, the structure and operation of the intermittent drive device 100 will be described.

Figure 2:
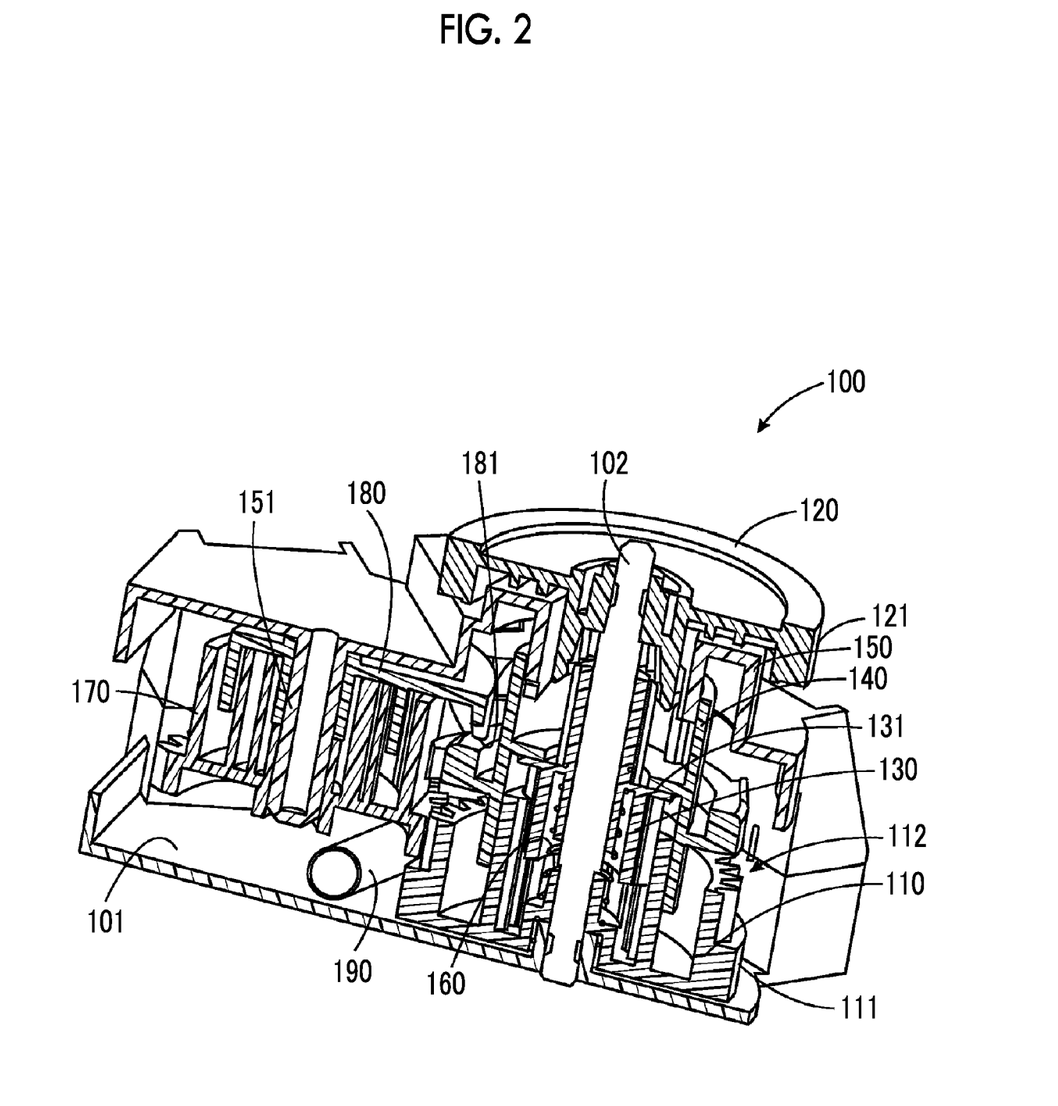
FIG. 2 is a cross-sectional perspective view of an intermittent drive device.

FIG. 2 is a cross-sectional perspective view of the intermittent drive device. Here, the intermittent drive device 100 will be described in detail with reference to FIG. 2.

The intermittent drive device 100 has a shaft member 102 supported by a base member 101. Also, the input gear 110 is rotatably supported on the shaft member 102 immediately above the base member 101, and an output gear 120 is rotatably supported at the top away from the input gear 110 in a rotation axis direction.

A first gear train 111 is formed over one circumference at a lower portion of the input gear 110, and a second gear train 112 having a diameter smaller than the diameter of the first gear train 111 is formed over one circumference on the first gear train 111. Here, with respect to the second gear train 112, the unevenness of a gear train is shown due to the need to explain the interaction with a tooth-missing gear 170, which will be described below. On the other hand, the first gear train 111 is a gear train that plays a role of simply receiving the driving force transmitted from the motor (not shown) and does not come into contact with the tooth-missing gear 170. Here, the first gear train 111 is shown as a simple circular shape by omitting the illustration of the unevenness of the teeth. Here, the input gear 110, the first gear train 111, and the second gear train 112 correspond to examples of an input gear, a first tooth row, and a second tooth row, respectively, as referred to in the present invention.

Additionally, the output gear 120 has a gear train 121 formed over one circumference at a maximum diameter portion thereof. Similar to the first gear train 111 of the input gear 110, the gear train 121 is also shown as a simple circular shape by omitting the illustration of the unevenness of the teeth. The gear train 121 plays a role of outputting the driving force toward the timing adjustment roll 74 shown in FIG. 1. The output gear 120 corresponds to an example of an output gear as referred to in the present invention.

Additionally, in addition to the input gear 110 and the output gear 120, a coupling member 130, a slide member 140, and a latch member 150 are provided around the shaft member 102 in this order from the input gear 110 side. A coil spring 160 is further provided around the shaft member 102.

The coupling member 130 plays a role of transmitting the driving force received by the input gear 110 to the output gear 120. The coupling member 130 is movable up and down along the shaft member 102 and is pushed up toward the output gear 120 by the coil spring 160 to mesh with the output gear 120. Then, in a case where the cam member 180 described below pushes down the slide member 140, the coupling member 130 is also pushed down via the slide member 140, the coupling member 130 is separated from the output gear 120, and the transmission of the driving force to the output gear 120 is cut off.

The slide member 140 rides on a shoulder portion 131 of the coupling member 130 and is pushed up together with the coupling member 130 by the coil spring 160. Additionally, the slide member 140 is pushed down by the cam member 180. Moreover, the slide member 140 is latched in a pushed-down state due to interference with the latch member 150 and is released from the latch and pushed by the coil spring 160 to be lifted up to a position where the coupling member 130 meshes with the output gear 120. The slide member 140 not only slides up and down together with the coupling member 130 but also is rotatable around the shaft member 102 for latching to and releasing from the latch member 150.

Here, the coupling member 130, the slide member 140, the latch member 150, and the coil spring 160 in the intermittent drive device 100 of the present exemplary embodiment correspond to examples of a shaft joint member, a moving member, and a movement positioning member, and a second spring member, respectively, as referred to in the present invention.

The intermittent drive device 100 is further provided with the tooth-missing gear 170, the cam member 180, and a coil spring 190.

Figure 6:
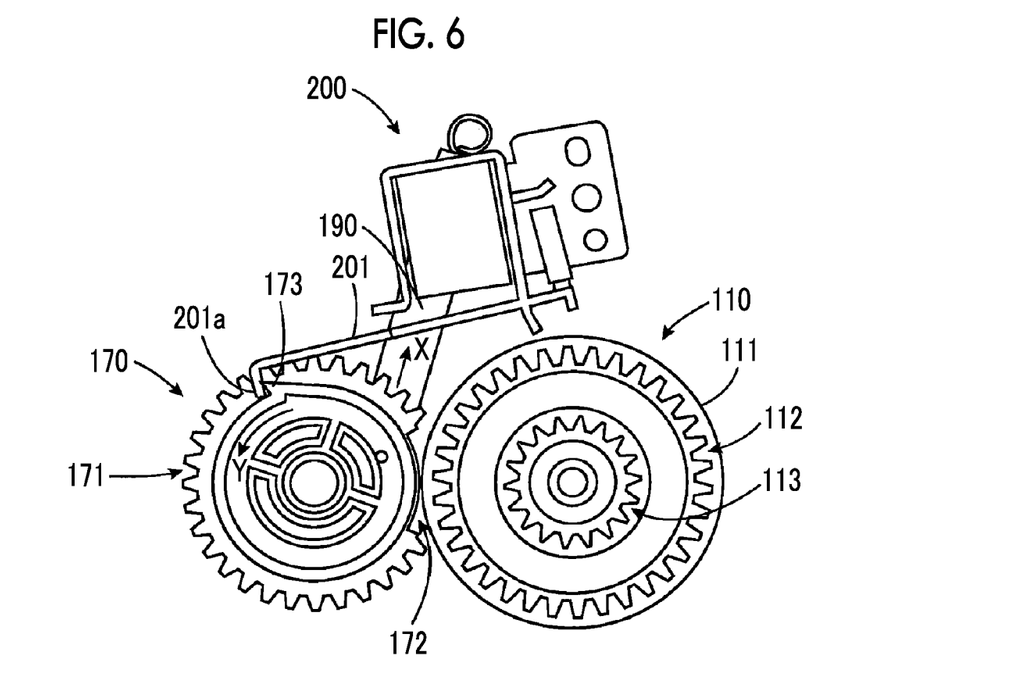
FIG. 6 is a view showing the same clutch mechanism as in FIG. 5 as viewed from an output gear side.

As shown in FIG. 6, for example, the tooth-missing gear 170 is a gear in which the gear train 171 is not formed over one circumference and a tooth-missing region 172 in which a gear train is missing is present. The tooth-missing gear 170 is rotatably supported by a shaft portion 151 formed in a part of the latch member 150 and meshes with the second gear train 112 of the input gear 110 to rotate. In a case where the tooth-missing region 172 faces with the second gear train 112, the meshing is disengaged and the rotation is stopped.

Additionally, the cam member 180 is a member that rotates or stops integrally with the tooth-missing gear 170 to push down the slide member 140 or release the push-down.

Additionally, the coil spring 190 is hung on the base member 101 and the tooth-missing gear 170, and as shown in FIG. 6, plays a role of pulling the tooth-missing gear 170 in a direction (a direction indicated by an arrow Y) in which the tooth-missing gear 170 is rotated in a case where the tooth-missing region 172 of the tooth-missing gear 170 faces the second gear train 112 side and the meshing between the tooth-missing gear 170 and the second gear train 112 are in a released state.

Additionally, although not shown in FIG. 1, for example, as shown in FIG. 6, the intermittent drive device 100 is provided with a solenoid 200. The solenoid 200 includes an arm 201, and a hook portion 201a is provided at the tip of the arm 201 so as to be hooked on the claw portion 173 of the tooth-missing gear 170 to prevent the rotation of the tooth-missing gear 170.

Here, the tooth-missing gear 170, the cam member 180, the coil spring 190, and the solenoid 200 in the intermittent drive device 100 correspond to examples of a tooth-missing gear, a cam member, a first spring member, and a solenoid, respectively, as referred to in the present invention. Additionally, the arm 201 with the hook portion 201a provided on the solenoid 200 corresponds to an example of an arm portion as referred to in the present invention.

Hereinafter, the interaction between the respective members constituting the intermittent drive device 100 shown in FIG. 1 will be described.

Figure 3A:
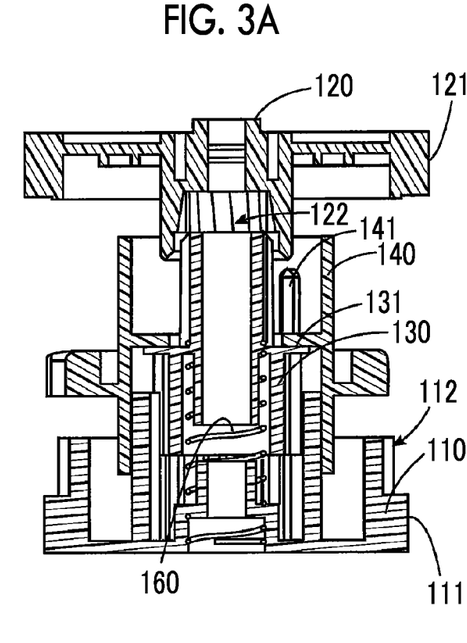
FIGS. 3A and 3B are cross-sectional views showing a non-connected state (FIG. 3A) and a connected state (FIG. 3B) between an input gear and an output gear.
Figure 3B:
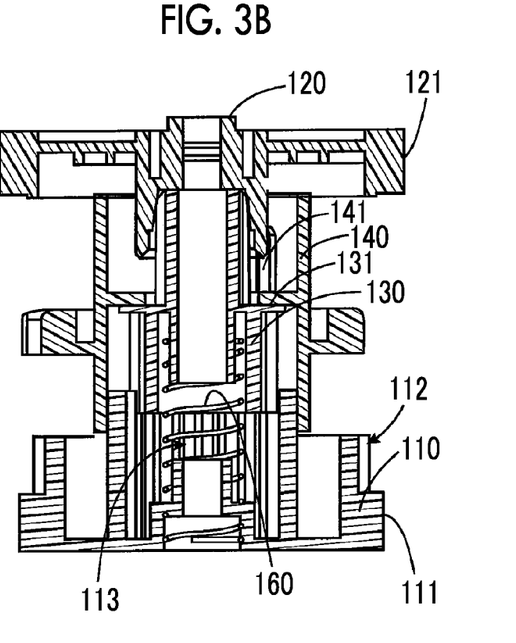

FIGS. 3A and 3B are cross-sectional views showing a non-connected state (FIG. 3A) and a connected state (FIG. 3B) between the input gear and the output gear. In addition, in respective drawings after FIGS. 3A and 3B, basically, only the members necessary for the explanation are shown, and the members not necessary for the explanation are omitted.

In the non-connected state shown in FIG. 3A, the coupling member 130 and the slide member 140 are at lowered positions. The output gear 120 is provided with a gear train 122 that meshes with the coupling member 130, in addition to the gear train 121 for transmitting the driving force to the outside. In the non-connected state shown in FIG. 3A, the coupling member 130 is at a lowered position and is separated from the gear train 122 of the output gear 120.

In the connected state shown in FIG. 3B, the coupling member 130 and the slide member 140 are at raised positions. The input gear 110 is provided with a gear train 113 that meshes with the coupling member 130, in addition to the first gear train 111 that receives the driving force from the outside and the second gear train that meshes with the tooth-missing gear 170. The gear train 113 always meshes with the gear train 113 of the input gear 110 in either the non-connected state shown in FIG. 3A or the connected state shown in FIG. 3B. Therefore, the coupling member 130 rotates with the rotation of the input gear 110 in either the non-connected state or the connected state.

Figure 4:
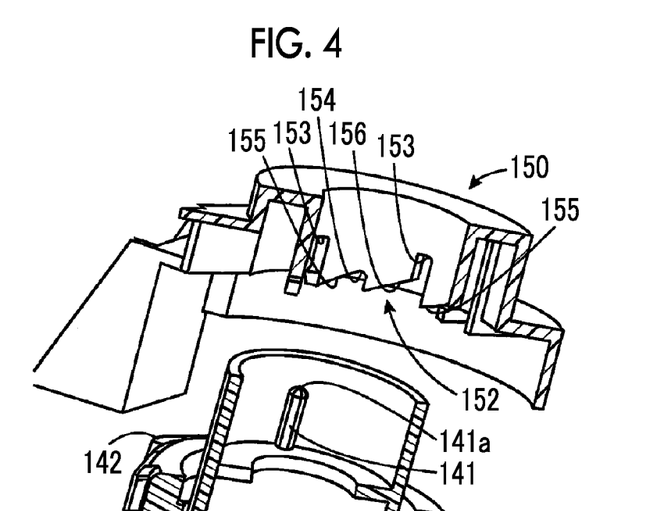
FIG. 4 is an explanatory view of a latch mechanism formed by a slide member and a latch member.

FIG. 4 is an explanatory view of a latch mechanism formed by the slide member and the latch member.

The latch member 150 has a latch portion 152 that faces the slide member 140 side. In the latch portion 152, a first groove 153 deeply cut upward and a second groove 154 shallower than the first groove 153 are alternately formed at intervals in the circumferential direction. Also, the first groove 153 and the second groove 154 are connected to each other by an ascending slope 155 facing the second groove 154 from the first groove 153 and an ascending slope 156 facing the first groove 153 from the second groove 154.

Additionally, the slide member 140 is formed with a columnar portion 141 that protrudes inward and extends in an upward-downward direction. The columnar portion 141 enters the first groove 153 or the second groove 154 depending on the rotational position of the slide member 140, or a top portion 141a of the columnar portion 141 comes into contact with the ascending slope 155 or the ascending slope 156.

In a case where the columnar portion 141 enters the first groove 153, the columnar portion 141 is pushed by the coil spring 160 and the slide member 140 and the coupling member 130 move upward, and as shown in FIG. 3B, the coupling member 130 meshes with the gear train 122 of the output gear 120 and is brought into the connected state in which the driving force is transmitted from the input gear 110 to the output gear 120. The height position of the coupling member 130, which has moved upward as the columnar portion 141 enters the first groove 153, is referred to as a "first position" here.

Additionally, in a case where the columnar portion 141 enters the second groove 154, the slide member 140 and the coupling member 130 are latched in a downwardly pushed-down state, and as shown in FIG. 3A, the coupling member 130 is separated from the output gear 120 and is brought the non-connected state in which the driving force is not transmitted from the input gear 110 to the output gear 120. The height position of the coupling member 130 in the downwardly pushed-down state as the columnar portion 141 enters the second groove 154 is referred to as a "second position" here.

As mentioned above, the slide member 140 is pushed down by the cam member 180. In the slide member 140, the columnar portion 141 comes out of the first groove 153 or the second groove 154, and the top portion 141a of the columnar portion 141 is in a state of being spaced apart from the latch portion 152. The height position of the coupling member 130 in this state is referred to as a "third position" here.

Here, the latch portion 152 of the latch member 150, the first groove 153 and the second groove 154 of the latch portion 152 correspond to examples of a latch portion, a first groove, and a second groove, respectively, as referred to in the present invention. Additionally, both of the ascending slopes 155 and 156 of the latch portion 152 correspond to an example of a slope as referred to in the present invention. Moreover, the columnar portion 141 of the slide member 140 corresponds to an example of an acting portion as referred to in the present invention.

Figure 5:
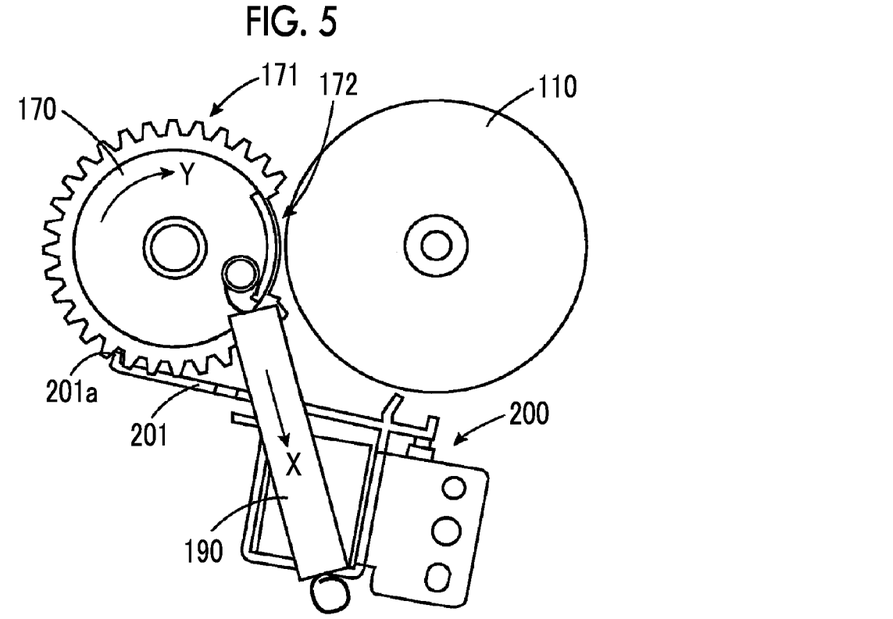
FIG. 5 is a view showing a clutch mechanism for switching between rotation and stop of a tooth-missing gear.

FIG. 5 is a view showing a clutch mechanism for switching between the rotation and stop of the tooth-missing gear. FIG. 5 is a view showing a shape seen from the base member 101 side.

Additionally, FIG. 6 is a view showing the same clutch mechanism as in FIG. 5 as viewed from the output gear side.

In FIGS. 5 and 6, the tooth-missing region 172 of the tooth-missing gear 170 is at a rotational position facing a second gear train 112 of the input gear 110, and the tooth-missing gear 170 is separated from the input gear 110. The tooth-missing gear 170 in this state is pulled by the coil spring 190 in the direction of an arrow X and thereby receives a rotational force in the direction of an arrow Y. However, since the hook portion 201a at the tip of the arm 201 of the solenoid 200 is hooked on the claw portion 173 of the tooth-missing gear 170, the tooth-missing gear 170 is prevented from rotating, and the rotational position thereof shown in FIG. 5 and FIG. 6 is kept without change.

Figure 7:
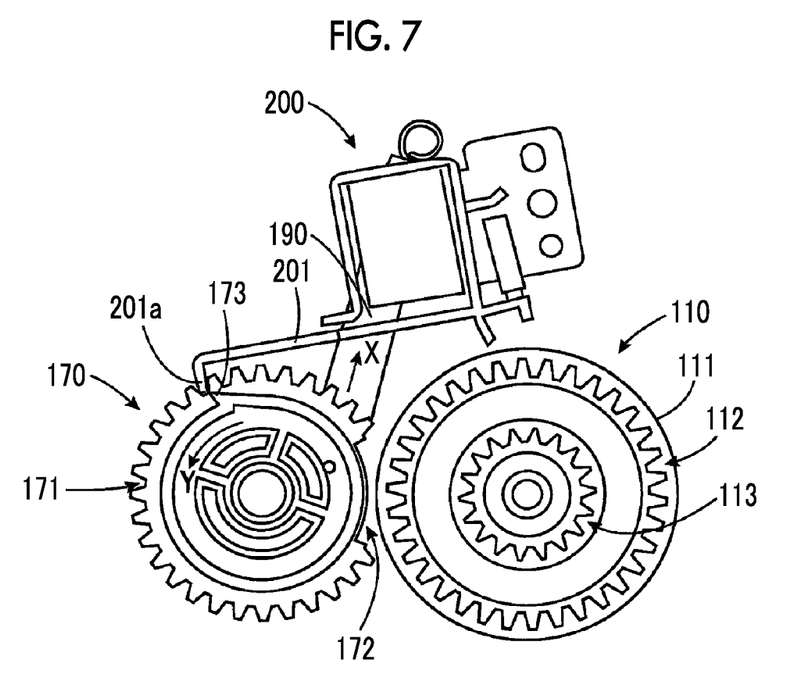
FIG. 7 is a view showing a clutch mechanism immediately after a solenoid is energized.

FIG. 7 is a view showing the clutch mechanism immediately after the solenoid is energized.

In a case where the solenoid 200 is energized, the arm 201 is pulled by the magnetic force of the solenoid, and the hook portion 201a is disengaged from the claw portion 173. Then, the tooth-missing gear 170 is pulled in the direction of the arrow X direction by the coil spring 190 and starts rotating in the direction of the arrow Y.

Figure 8:
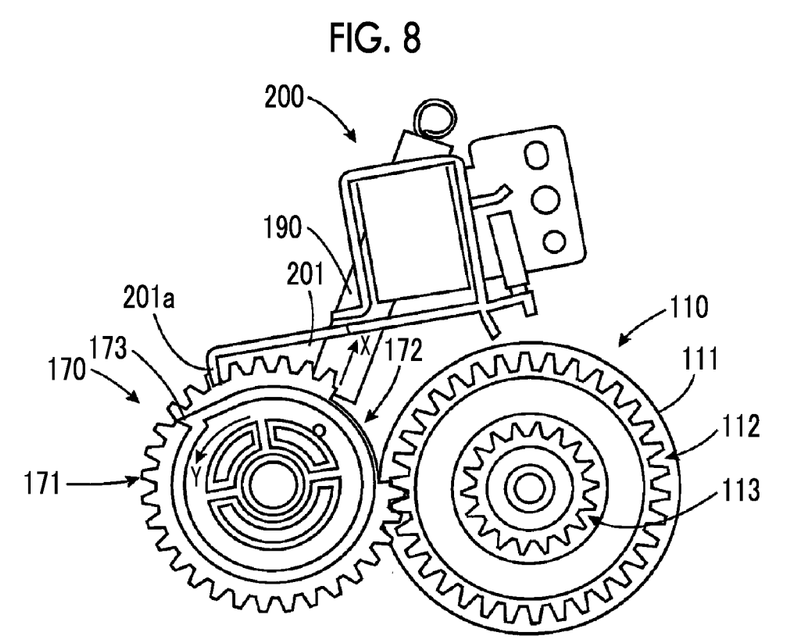
FIG. 8 is a view showing the clutch mechanism in an initial stage in which the rotation is started.

FIG. 8 is a view showing the clutch mechanism in an initial stage in which the rotation is started.

In a case where the tooth-missing gear 170 starts rotating in the direction of the arrow Y by the action of the coil spring 190, as shown in FIG. 8, a part of the gear train 171 of the tooth-missing gear 70 meshes with a second tooth row of the input gear 110. Thereafter, the tooth-missing gear 170 rotates due to the meshing with the second gear train 112 of the input gear 110 once meshed.

Here, the input gear 110 is provided with the second gear train 112 that meshes with the tooth-missing gear 170, separately from the first gear train 111 that receives the driving force from the motor (not shown). For this reason, even in the intermittent drive device having the specifications in which the input gear 110 is rotated at high speed, a design is adopted in which the diameter of the second tooth row and the number of gears are appropriately selected. Accordingly, the tooth-missing gear 170 can be operated at an appropriate speed, and stable operation can be ensured. For example, the second gear train 112 is not present in the input gear 110 and the first gear train 111 itself that receives the driving force from the motor drives the tooth-missing gear 170, it is necessary to operate the clutch mechanism stably. Thus, compared to the clutch mechanism of the present exemplary embodiment in which the second gear train 112 is provided separately from the first gear train 111, the rotational speed of the input gear 110 is limited from the viewpoint of stable operation of the clutch mechanism.

Alternatively, instead of driving the tooth-missing gear 170 with the input gear 110, a configuration is also conceivable in which the tooth-missing gear 170 is driven by a gear separate from the input gear 110. However, in that case, dual-system drive mechanisms, one for driving the input gear 110 and the other for driving the tooth-missing gear 170, are required, which may lead to an increase in size.

Returning to FIG. 8, the clutch mechanism of the present exemplary embodiment will be described.

In the state shown in FIG. 8, that is, in a case where a part of the gear train 171 of the tooth-missing gear 170 meshes with the second gear train 112 of the input gear 110, the solenoid 200 no longer needs to be energized and the energization is cut off. In a case where the energization is cut off, the arm 201 of the solenoid 200 returns to an original posture thereof, but the claw portion 173 of the tooth-missing gear 170 has passed, and the rotation of the tooth-missing gear 170 continues without change. Then, in a case where the tooth-missing gear 170 goes around and the tooth-missing region 172 faces the second gear train 112 side, the hook portion 201a at the tip of the arm 201 is hooked on the claw portion 173 and stops at the rotational position thereof, that is, that is, the rotational position shown in FIGS. 5 and 6. Here, the clutch mechanism described with reference to FIGS. 5 to 8 corresponds to an example of a tooth-missing gear control mechanism as referred to in the present invention.

In a case where the tooth-missing gear 170 starts rotating, switching to the connected state shown in FIG. 3B is made in the non-connected state shown in FIG. 3A until then, or switching to the non-connected state shown in FIG. 3A is made in the connected state shown in FIG. 3B until then.

Hereinafter, the switching mechanism will be described.

Figure 9:
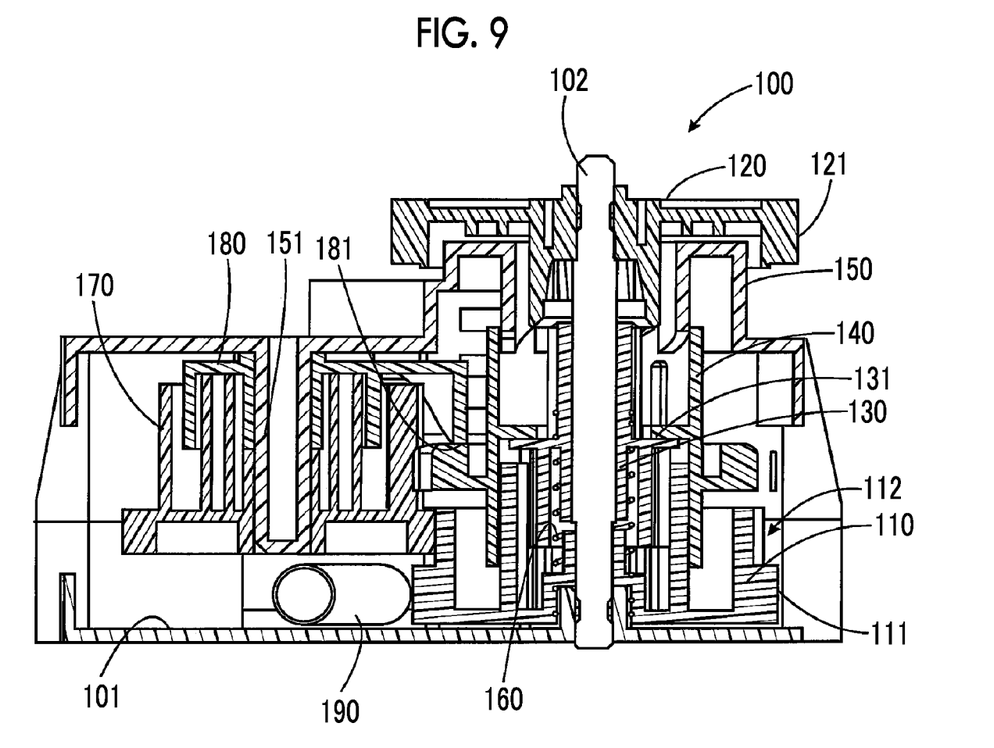
FIG. 9 is a cross-sectional view showing a state in which the slide member and a coupling member are pushed down by a cam member.

FIG. 9 is a cross-sectional view showing a state in which the slide member 140 and the coupling member 130 are pushed down by the cam member.

In a case where the tooth-missing gear 170 starts rotating, the cam member 180 also rotates together with the tooth-missing gear 170, the slide member 140 is directly pushed down by a cam portion 181 of the cam member 180, and the coupling member 130 is also pushed down by the slide member 140.

Figure 10:
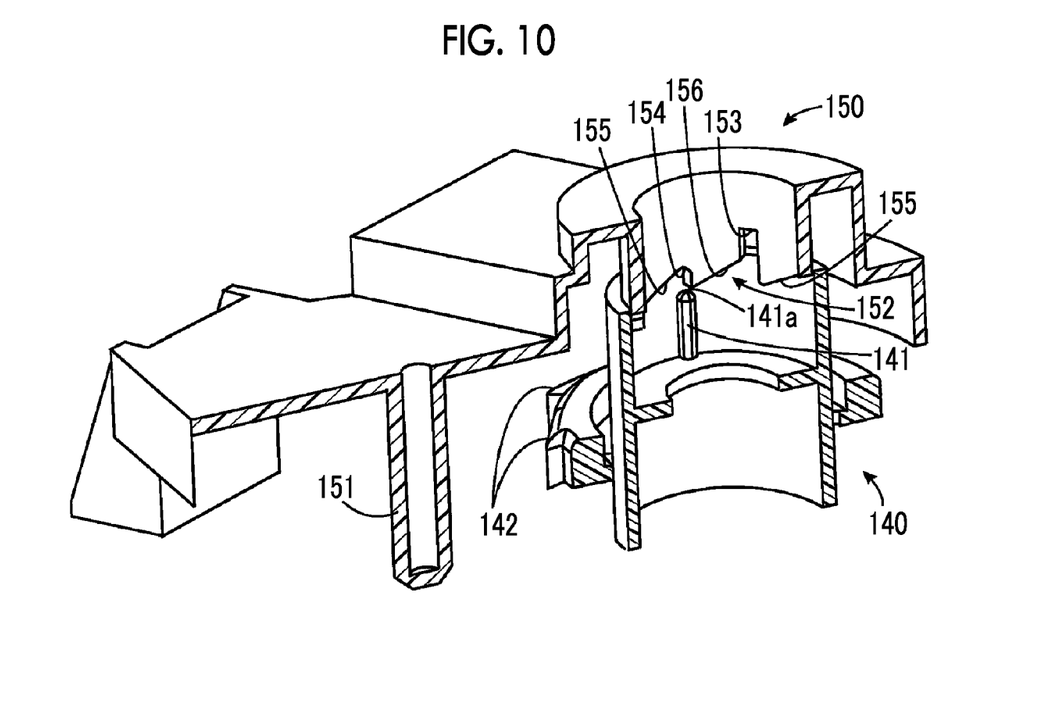
FIG. 10 is an explanatory view of the operation of the latch mechanism formed by the slide member and the latch member.

FIG. 10 is an explanatory view of the operation of the latch mechanism formed by the slide member and the latch member.

The slide member 140 is pushed down to the height position shown in FIG. 10 by the latch portion 152 of the latch member 150. FIG. 10 shows that the columnar portion 141 of the slide member 140 has entered the second groove 154 until just before being pushed down. As mentioned above, the height position of the coupling member 130 in a case where the columnar portion 141 has entered the second groove 154 is the "second position" in the non-connected state where the connection between the coupling member 130 and the output gear 120 as shown in FIG. 3A is disengaged. FIG. 10 shows the slide member 140 in the pushed-down state until the columnar portion 141 is disengaged from the second groove 154. The coupling member 130 in this case is at a "third position" where the coupling member 130 is further pushed down from the "second position".

FIG. 10 shows the claw portion 142 of the slide member 140. In a case where the slide member 140 is pushed down by the cam member 180, the claw portion 142 is at the same height position as the claw portion 173 (for example, refer to FIG. 6) of the tooth-missing gear 170. Also, the claw portion 142 is at a position where the claw portion 142 interferes with the claw portion 173 of the tooth-missing gear 170 in a case where the tooth-missing gear 170 rotates.

Figure 11:
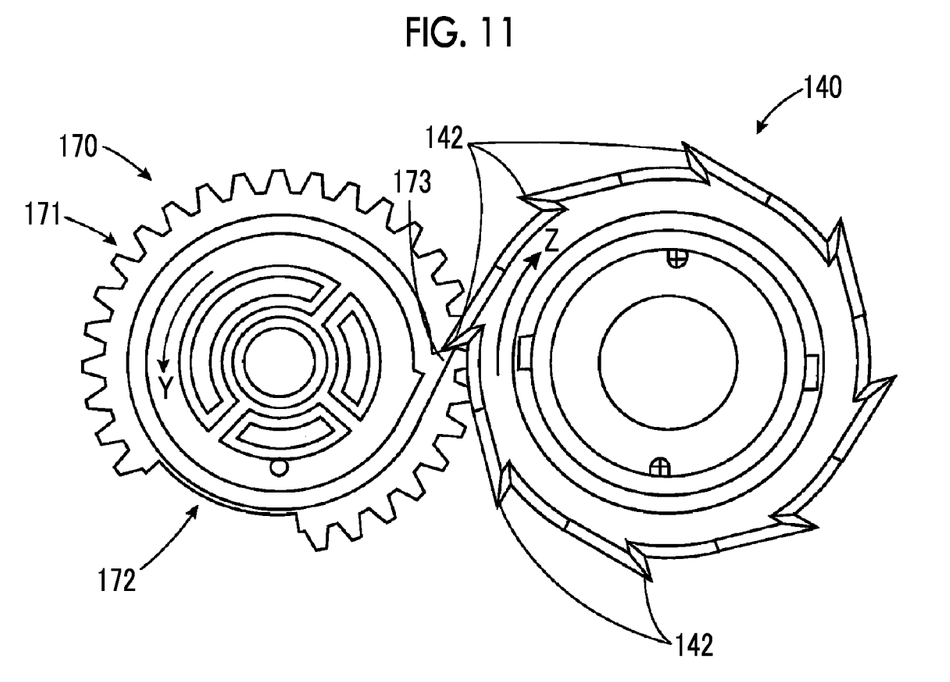
FIG. 11 is a view showing an interaction between the tooth-missing gear and the slide member.

FIG. 11 is a view showing an interaction between the tooth-missing gear and the slide member.

A plurality of the claw portions 142 are formed on the slide member 140 at equal intervals in the circumferential direction. The spacing between the plurality of claw portions 142, that is, the angle in the circumferential direction between the adjacent claw portions coincides with the angle in the circumferential direction between the first groove 153 and the second groove 154 formed in the latch portion 152 of the latch member 150.

FIG. 11 shows a state in which the tooth-missing gear 170 rotates in the direction of the arrow Y and the claw portion 173 of the tooth-missing gear 170 is in contact with the claw portion 142 of the slide member 140. In a case where the claw portion 173 of the tooth-missing gear 170 comes into contact with the claw portion 142 of the slide member 140, the claw portion 173 of the tooth-missing gear 170 is pushed by the claw portion 142 of the slide member 140 due to the subsequent rotation of the tooth-missing gear 170, and the slide member 140 rotates in the direction of an arrow Z until the claw portion 173 of the tooth-missing gear 170 is disengaged from the claw portion 142 of the slide member 140. The claw portion 142 of the slide member 140 corresponds to an example of an interference portion as referred to in the present invention.

Figure 12:
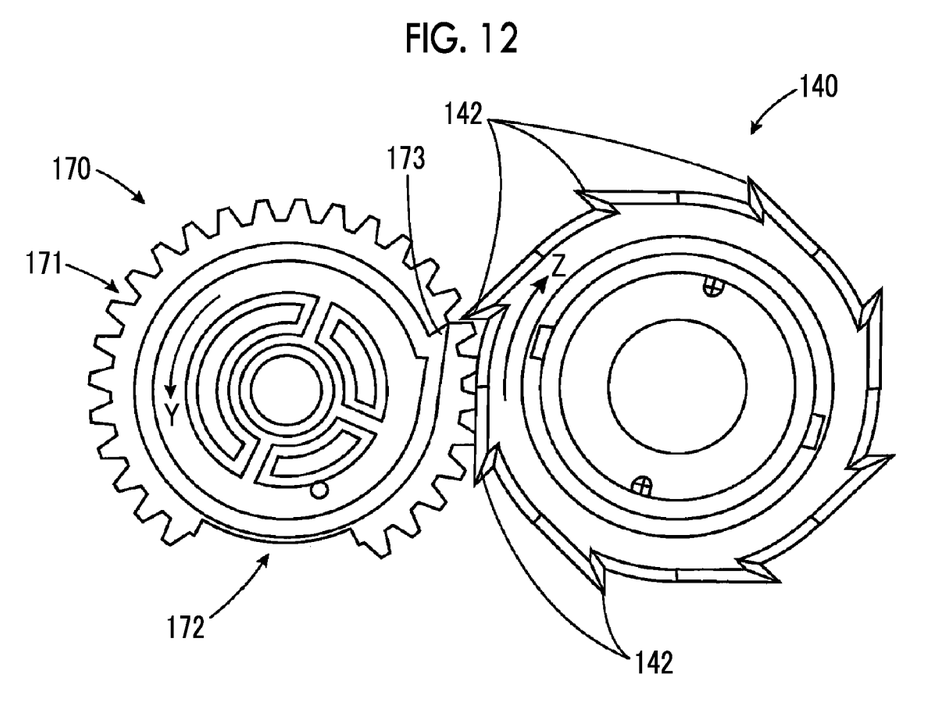
FIG. 12 is a view showing the tooth-missing gear and the slide member in a state in which the slide member is rotated by being pushed by a claw portion of the tooth-missing gear.

FIG. 12 is a view showing the tooth-missing gear and the slide member in a state in which the slide member is rotated by being pushed by the claw portion of the tooth-missing gear.

The slide member 140 is released from being pushed down by the cam member 180 in a stage in which the slide member 140 has rotated to a rotational position shown in FIG. 12. Then, the slide member 140 is pushed up together with the coupling member 130 by the coil spring 160.

Figure 13:
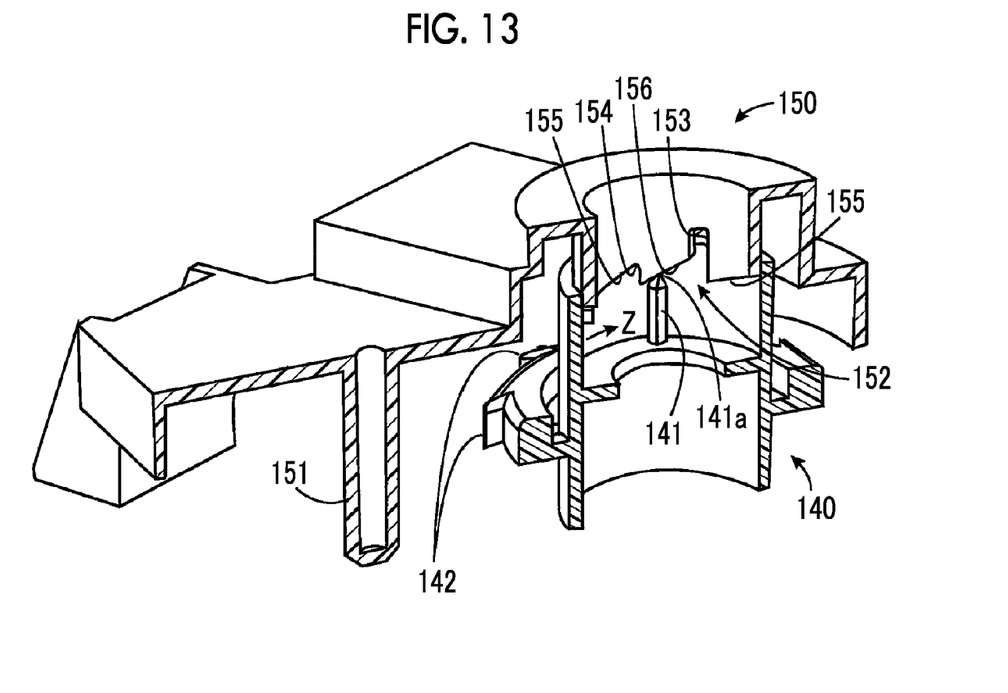
FIG. 13 is a view showing the latch member and the slide member in a pushed-up state.

FIG. 13 is a view showing the latch member and the slide member in a pushed-up state.

As described above, the slide member 140 rotates slightly due to the interference between the claw portion 173 and the claw portion 142, and in the rotated state, the slide member 140 is released from being pushed down by the cam member 180. Then, as shown in FIG. 13, a top portion 141a of the columnar portion 141 of the slide member 140 butts against the position of the ascending slope 156 slightly disengaged from directly below the second groove 154. The position where the top portion 141a of the columnar portion 141 has butted against is the ascending slope 156, and since the slide member 140 is further pushed by the coil spring 160, the slide member 140 continues to rotate further in the direction of the arrow Z.

Figure 14:
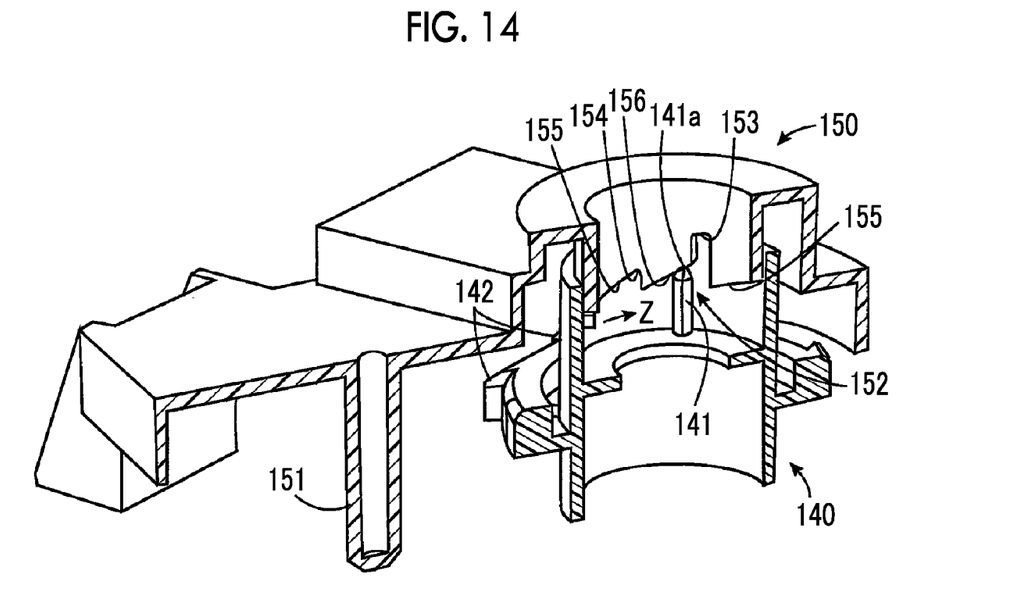
FIG. 14 is a view showing the latch member and the slide member in a state in which the rotation is started after a columnar portion has butted against a slope.

FIG. 14 is a view showing the latch member and the slide member in a state in which the rotation is started after the columnar portion has butted against the slope.

Figure 15:
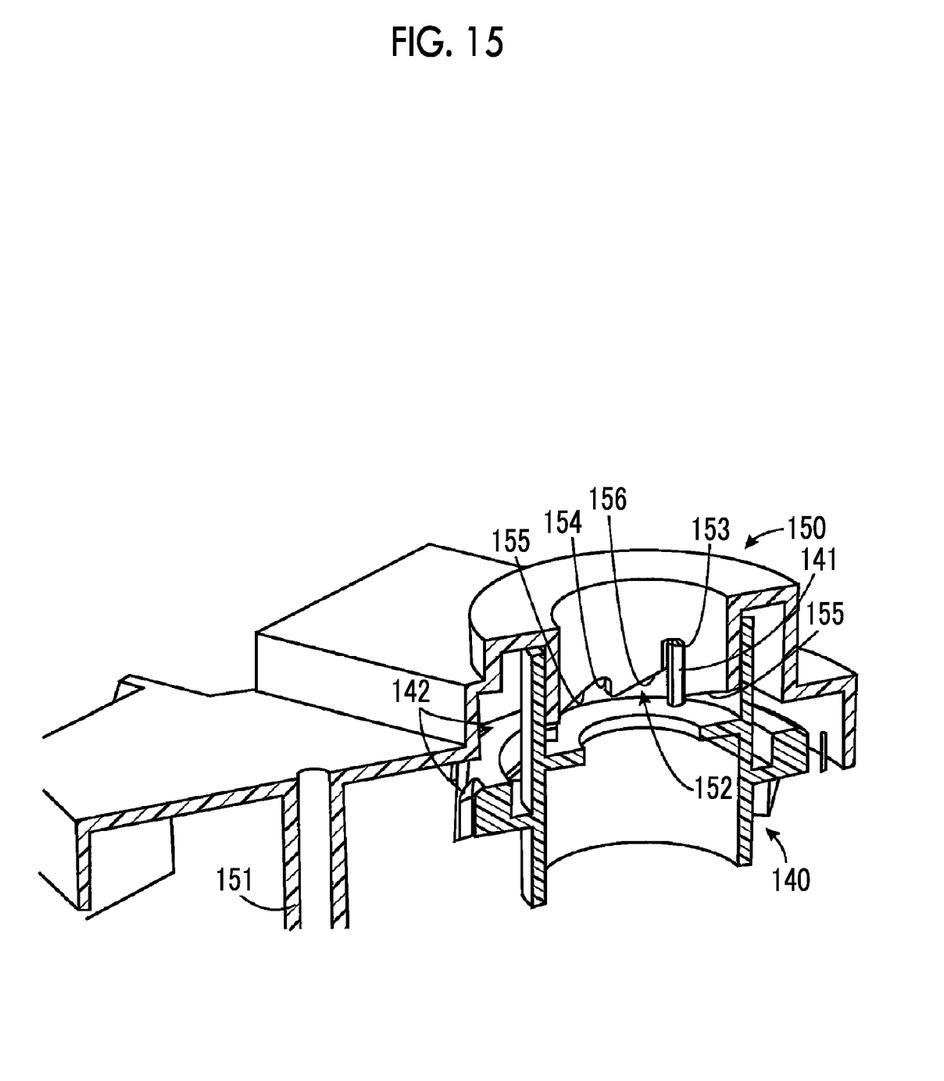
FIG. 15 is a view showing the latch member and the slide member in a state in which the columnar portion has entered a first groove.

Additionally, FIG. 15 is a view showing the latch member and the slide member in a state in which the columnar portion has entered the first groove.

In a case where the slide member 140 is released from being pushed down by the cam member 180 and pushed up by the coil spring 160, the top portion 141a of the columnar portion 141 butts against the ascending slope 156 as shown in FIG. 13. Then, as the coil spring 160 is further pushed up, as shown in FIG. 14, the top portion 141a of the columnar portion 141 advances along the ascending slope 156. That is, the slide member 140 rotates in the direction of the arrow Z while being pushed up by the coil spring 160. Then, finally, as shown in FIG. 15, the rotation of the slide member 140 is stopped in a state in which the columnar portion 141 has entered the first groove 153. In this case, the coupling member 130 is lifted to the "first position", that is, the height position where the connected state shown in FIG. 3B is brought about.

Also, in a case where the connected state shown in FIG. 3B is switched to the non-connected state shown in FIG. 3A, the same switching operation as in a case where the non-connected state shown in FIG. 3A described above is switched to the connected state shown in FIG. 3B is performed. That is, the solenoid 200 is energized and the tooth-missing gear 170 rotates. Then, the slide member 140 is pushed down by the cam member 180 that rotates together with the tooth-missing gear 170, and the columnar portion 141 comes out of the first groove 153. Then, the claw portion 142 of the slide member 140 is pushed by the claw portion 173 of the tooth-missing gear 170, and the slide member 140 rotates slightly. Then, in that stage, the slide member 140 is released from being pushed down by the cam member 180. Then, the slide member 140 is pushed up by the coil spring 160, and the top portion 141a of the columnar portion 141 butts against the ascending slope 155. Then, due to the further push-up by the coil spring 160, the slide member 140 rotates, and the columnar portion 141 enters the second groove 154. In a case where the columnar portion 141 enters the second groove 154, the rotation of the slide member 140 is stopped. In a case where the columnar portion 141 of the slide member 140 enters the second groove 154, the coupling member 130 is lifted up to the "second position". The "second position" is the height position in the non-connected state shown in FIG. 3A, and the non-connected state is maintained until the solenoid 200 is next energized.

As described above, according to the intermittent drive device 100 of the present exemplary embodiment, the first gear train 111 and the second gear train 112 are formed in the input gear 110. Therefore, even in the case of the intermittent drive device of the specifications for rotating the input gear 110 at high speed, it is possible to design the tooth-missing gear 170 so as to have an appropriate rotational speed that enables a stable operation. Additionally, it is possible to drive the intermittent drive device 100 by only one system, and it is possible to reduce the size of the intermittent drive system as compared to a configuration in which a drive system for driving the input gear and a drive system for driving the tooth-missing gear are separate systems.

Additionally, since the intermittent drive device of the present exemplary embodiment includes the above-described latch mechanism, it is possible to switch the non-connected state and the connected state to each other by energizing the solenoid for a short time, and it is possible to achieve power saving.

In addition, although an example in which the intermittent drive device is applied to the ink jet printer has been described here, the intermittent drive device of the present invention is not limited to the ink jet printer, and can also be applied to various types of printers such as an electrophotographic printer. Moreover, the field of application of the intermittent drive device of the present invention is not limited to the printers, and can be widely applied to a case where it is necessary to a driven body serving as a drive target is intermittently driven.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An intermittent drive device comprising:
   a tooth-missing gear in which a tooth row is partially missing;
   an output gear;
   an input gear that is provided with a first tooth row that receives a driving force and does not come into contact with the tooth-missing gear and a second tooth row that transmits the driving force to the tooth-missing gear and that is arranged at a position apart from the output gear in a rotation axis direction;
   a shaft joint member that moves in the rotation axis direction to a first position where the driving force of the input gear is transmitted to the output gear and a second position where the transmission is released;
   a tooth-missing gear control mechanism that starts rotation of the tooth-missing gear from a state in which the driving force from the input gear is released and meshes with the input gear; and
   a switching mechanism that switches a position of the shaft joint member in the rotation axis direction between the first position and the second position.

2. The intermittent drive device according to claim 1, wherein the tooth-missing gear control mechanism includes
   a first spring member that urges the tooth-missing gear in a state in which the driving force from the input gear is released, in a direction of meshing with the input gear, and
   a solenoid provided with an arm portion that is hooked on the tooth-missing gear in a state in which the driving force from the input gear is released to prevent rotation made by the first spring member, and that releases the hooking by energizing the solenoid.

3. The intermittent drive device according to claim 2, wherein the switching mechanism includes
   a second spring member that urges the shaft joint member toward the first position,
   a moving member that receives the urging of the second spring member via the shaft joint member, moves in the rotation axis direction together with the shaft joint member, and is rotatable around the rotation axis,
   a cam member that rotates together with the tooth-missing gear to interfere with the moving member and moves the shaft joint member to a third position further away from the first position than the second position, and
   a movement positioning member provided with a latch portion having a first groove that interferes with the moving member to move the shaft joint member to the first position, a second groove that holds the shaft joint member at the second position, and a slope that is formed between the first groove and the second groove and performs guiding into the first groove or the second groove, and
   the moving member has an acting portion that enters the first groove or the second groove or is in contact with the slope of the latch portion, depending on a rotational position of the moving member.

4. The intermittent drive device according to claim 3, wherein the moving member has an interference portion that interferes with the tooth-missing gear in a case where the shaft joint member moves to the third position, and
   the interference portion receives a rotational force from the tooth-missing gear so that the acting portion rotates to a position corresponding to the slope.

5. The intermittent drive device according to claim 2, wherein the tooth-missing gear has a claw portion on which the arm portion is hooked in a state in which the driving force from the input gear is released.

6. The intermittent drive device according to claim 5, wherein the switching mechanism includes
   a second spring member that urges the shaft joint member toward the first position,
   a moving member that receives the urging of the second spring member via the shaft joint member, moves in the rotation axis direction together with the shaft joint member, and is rotatable around the rotation axis,
   a cam member that rotates together with the tooth-missing gear to interfere with the moving member and moves the shaft joint member to a third position further away from the first position than the second position, and
   a movement positioning member provided with a latch portion having a first groove that interferes with the moving member to move the shaft joint member to the first position, a second groove that holds the shaft joint member at the second position, and a slope that is formed between the first groove and the second groove and performs guiding into the first groove or the second groove, and
   the moving member has an acting portion that enters the first groove or the second groove or is in contact with the slope of the latch portion, depending on a rotational position of the moving member.

7. The intermittent drive device according to claim 6, wherein the moving member has an interference portion that interferes with the tooth-missing gear in a case where the shaft joint member moves to the third position, and
   the interference portion receives a rotational force from the tooth-missing gear so that the acting portion rotates to a position corresponding to the slope.

8. The intermittent drive device according to claim 1, wherein the switching mechanism includes
   a second spring member that urges the shaft joint member toward the first position,
   a moving member that receives the urging of the second spring member via the shaft joint member, moves in the rotation axis direction together with the shaft joint member, and is rotatable around the rotation axis,
   a cam member that rotates together with the tooth-missing gear to interfere with the moving member and moves the shaft joint member to a third position further away from the first position than the second position, and
   a movement positioning member provided with a latch portion having a first groove that interferes with the moving member to move the shaft joint member to the first position, a second groove that holds the shaft joint member at the second position, and a slope that is formed between the first groove and the second groove and performs guiding into the first groove or the second groove, and
   the moving member has an acting portion that enters the first groove or the second groove or is in contact with the slope of the latch portion, depending on a rotational position of the moving member.

9. The intermittent drive device according to claim 8,
wherein the moving member has an interference portion that interferes with the tooth-missing gear in a case where the shaft joint member moves to the third position, and
the interference portion receives a rotational force from the tooth-missing gear so that the acting portion rotates to a position corresponding to the slope.

\* \* \* \* \*